United States Patent [19]

Gunn

[11] 4,244,995
[45] Jan. 13, 1981

[54] ONE PIECE MOLDED PICTURE FRAME AND METHOD OF MAKING THE SAME

[76] Inventor: Gerald E. W. Gunn, 3126 Division St., Los Angeles, Calif. 90065

[21] Appl. No.: 24,527

[22] Filed: Mar. 28, 1979

[51] Int. Cl.³ .................. A47G 1/06; B29C 17/07; B32B 3/28
[52] U.S. Cl. .......................... 428/65; 40/154; 264/151; 264/506; 264/569; 264/DIG. 41; 264/DIG. 67; 428/10; 428/14; 428/66; 428/182; D6/243; D6/245
[58] Field of Search ............ 40/152, 154; 264/150, 264/151, 209, 210 R, 500, 505–508, 566, 569, DIG. 41, DIG. 52, DIG. 67; 428/10, 35, 36, 64–66, 131, 179, 181, 182, 187, 14; D6/232, 243, 245

[56] References Cited

U.S. PATENT DOCUMENTS

| 1,933,019 | 10/1933 | Laubi | 264/508 X |
| 3,372,920 | 3/1968 | Corbett et al. | 264/508 |

Primary Examiner—Bruce H. Hess
Attorney, Agent, or Firm—Sellers and Brace

[57] ABSTRACT

A picture frame and method of making the same from a rising tube of fluent extruded plastic. The rising tube collapses inwardly to form the frame body as a ring of interfolded wrinkly sinuous corrugations. A stepped annular ring on the face of the extruder die is shaped to form a flat back for the frame along with a rabbeted inner rim edge suitable to seat a picture, mat and a backing plate.

6 Claims, 3 Drawing Figures

ONE PIECE MOLDED PICTURE FRAME AND METHOD OF MAKING THE SAME

This invention relates to picture frames, and more particularly to a unique molded plastic frame having a non repeatable intricately contoured configuration.

The invention picture frame is formed quickly and inexpensively from a thin walled tube of thermal plastic issuing from an extruder die. The warm fluent plastic collapses inwardly to form a thick rounded picture frame of intricately interfolded sinuous corrugations. An annular stream of cooling gas directed against the exterior side of the tube aids in assuring the inward collapse and the intricate and highly irregular interfolding of the fluent material before it begins to set. The formation of a rabbet along the inner rear surface of the frame is readily accomplished by providing a contoured surface on the upwardly facing end of the extruder die. As soon as the interfolding mass of corrugations takes a set it is severed from the die which then continues to make the next frame.

It is a primary object of this invention to provide a novel picture frame and method of making the same from an extruded tube of plastic material.

Another object of the invention is the provision of a plastic picture frame the main body of which comprises interfolded sinuous corrugations of tubular plastic stock which collapses as it discharges from an extruder.

These and other more specific objects will appear upon reading the following specification and claims and upon considering in connection therewith the attached drawing to which they relate.

Referring now to the drawing in which a preferred embodiment of the invention is illustrated:

Figure 1:
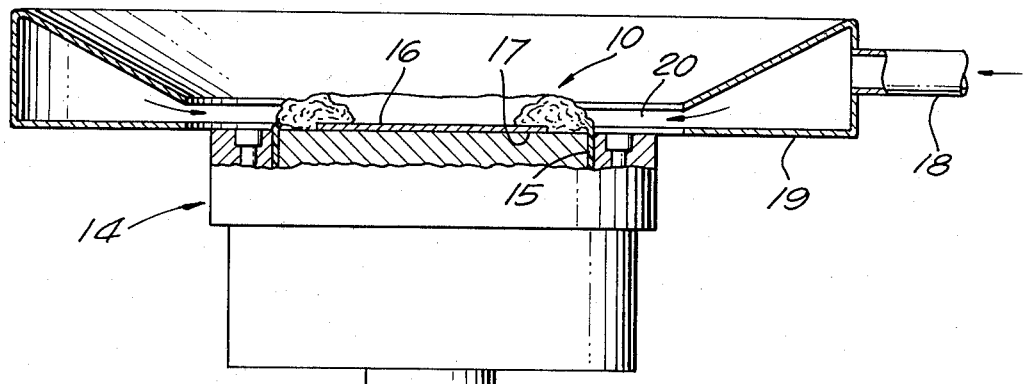
FIG. 1 is a partial cross sectional view illustrating extruder apparatus for forming the invention picture frame and showing a frame in readiness for removal from the apparatus.
Figure 3:
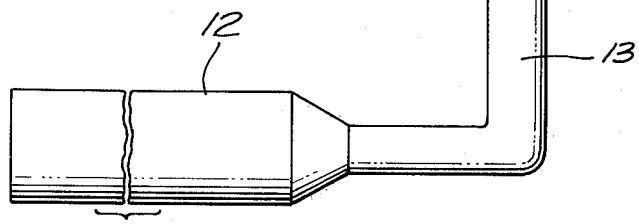
FIG. 3 is a cross sectional view taken along line 3—3 on FIG. 2.
Figure 3:
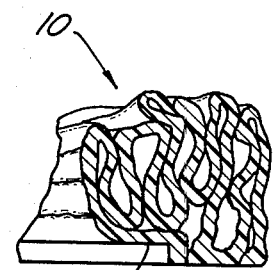
Figure 2:
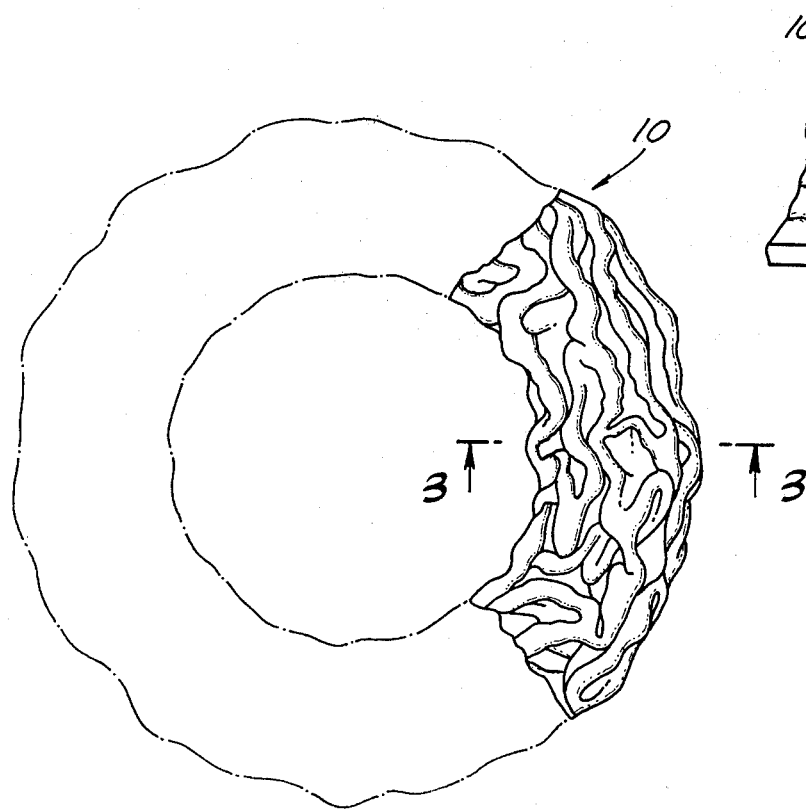
FIG. 2 is a plan view of a typical finished frame.

Referring to FIGS. 1 to 3, there is shown an illustrative picture frame, designated generally 10, embodying the present invention. FIG. 1 shows the frame substantially in readiness for removal from a suitable plastic extruder the discharge end 12 of which is equipped with an L-shaped fitting 13 terminating in an upwardly facing extruder die 14 designed to extrude a tube having a suitable wall thickness of 40 to 50 mils. This die is provided with an annular outlet orifice 15 lying in an upwardly facing horizontal plane. This surface is preferably stepped or provided with a separate plate 16 the perimeter of which is spaced sufficiently from the die orifice 15 to provide a rabbet 17 (FIG. 3) at the rear inner rim of the frame sufficiently deep to accommodate a picture assembly including a glass plate if used, the picture, a mat and a backing panel.

In use the extruder hopper, not shown, but located to the left of extruder 12 is filled with plastic pellets of any suitable resin. These pellets may be colored or uncolored depending upon the color desired in the finished picture frame 10. These pellets are subjected to heat and pressure in the extruder along which they are advanced through the outlet fitting 13 to the die 14.

The tubular plastic issuing from the annular orifice 15 has a temperature of about 300° F., or more. As the issuing tube of material rises it is impinged by a circular stream of cooling gas, such as air, supplied through pipe 18 to an annular distributing ring 19. This stream impinges upon the rising plastic material causing it to collapse inwardly in a highly irregular unpredictable configuration consisting primarily of deep corrugations of an intricately wrinkled sinuous configuration such as that depicted in full lines on the right side of FIG. 2 and in the cross sectional view shown in FIG. 3. The uppermost end of the tube is pressed inwardly by the stream of cooling air and collapses about the rim edge of the stepped plate 16 to form the rabbet 17.

When a suitable quantity of the plastic has collected, such as that shown in FIGS. 1 and 3, the extruding operation may be interrupted momentarily or the operator may simply run a sharp edged blade about the rim of orifice 15 to separate the completed frame from the extruder. Frame 10 is then removed to a horizontal surface while cooling and taking a firm and rigid set. Thereafter the inner and outer rim edges of the frame may be inspected and subjected to a smoothing and trimming operation.

The frame is now ready for use and mounting with pictures or other articles desired to be framed.

While the particular one piece molded picture frame and method of making the same herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A picture frame formed in one piece comprising a ring of interfolded corrugations of tubular plastic having a generally planar rear face.

2. A picture frame as defined in claim 1 characterized in that the outward side of said frame is generally rounded, and the rearward side is generally planar with a continuous rabbet along the inner rim edge thereof to seat a picture or the like.

3. A picture frame as defined in claim 1 characterized in that said corrugations are formed from an inwardly collapsing vertically disposed tube of plastic as it issues from an extruder die.

4. That method of making a picture frame which comprises extruding a tube of fluent thermoplastic material upwardly from a horizontally disposed upwardly facing extruder die, and circulating a cooling gas inwardly against said plastic as it issues from the extruder thereby causing said tube to collapse generally inwardly and interfold in sinuous distorted corrugations.

5. That method defined in claim 4 characterized in the step of collecting said collapsing tube of fluent plastic on a stepped surface shaped to provide said frame with a generally flat radial rear face having a continuous rabbet along the inner rim edge thereof.

6. That method defined in claim 4 characterized in the steps of using ambient air as the cooling gas and circulating a continuous ring thereof generally radially inwardly against the tube of fluent plastic.

* * * * *